(12) United States Patent
Viola et al.

(10) Patent No.: US 7,274,117 B1
(45) Date of Patent: Sep. 25, 2007

(54) RADIO WALL SWITCH

(75) Inventors: Roar Viola, Capestang (FR); Betrand Debever, San Jose, CA (US); Roy Nishi, Carlsbad, CA (US); Loiua Weidman, Oceanside, CA (US)

(73) Assignee: The Watt Stopper, Inc., Santa Clara, CA (US)

( * ) Notice: Subject to any disclaimer, the term of this patent is extended or adjusted under 35 U.S.C. 154(b) by 351 days.

(21) Appl. No.: 11/098,900

(22) Filed: Apr. 4, 2005

Related U.S. Application Data

(63) Continuation-in-part of application No. 10/934,222, filed on Sep. 3, 2004.

(60) Provisional application No. 60/625,370, filed on Nov. 5, 2004, provisional application No. 60/500,640, filed on Sep. 5, 2003.

(51) Int. Cl.
*H01B 1/24* (2006.01)
*H01H 19/14* (2006.01)

(52) U.S. Cl. ............... 307/112; 307/115

(58) Field of Classification Search ........ 315/312–315, 315/316–320; 345/170, 171, 172, 173; 307/112, 115, 137, 139, 140–141.8, 143, 307/153, 157
See application file for complete search history.

(56) References Cited

U.S. PATENT DOCUMENTS

| | | | |
|---|---|---|---|
| 3,225,265 A | 12/1965 | Krause et al. | 317/138 |
| 3,746,923 A | 7/1973 | Spira et al. | 315/291 |
| 3,971,028 A | 7/1976 | Funk | 343/225 |
| 4,044,060 A | 8/1977 | Buysch et al. | 260/651 R |
| 4,138,684 A | 2/1979 | Kerr | 343/846 |
| 4,163,218 A | 7/1979 | Wu | 340/310 A |
| 4,418,333 A | 11/1983 | Schwarzbach et al. | 340/310 A |
| 4,524,288 A | 6/1985 | Schimmelpennink et al. | 307/40 |
| 4,563,592 A | 1/1986 | Yuhasz et al. | 307/115 |

(Continued)

FOREIGN PATENT DOCUMENTS

EP    0 327 128 B1    8/1995

(Continued)

OTHER PUBLICATIONS

"Wireless Lans: Mobile-Computing's Second Wave", Electronic Design, Jun. 26, 1995, pp. 55-72.

(Continued)

*Primary Examiner*—Shih-Chao Chen
*Assistant Examiner*—Minh Dieu A
(74) *Attorney, Agent, or Firm*—Haverstock & Owens LLP

(57) ABSTRACT

A radio wall switch that uses radio signals to control a load through a load circuit is disclosed. The radio wall switch is also configured group or bind electronic devices to operate collectively by responding to the same radio control signals. Preferably, the radio wall switch and electronic devices are grouped or bound to reflect their location in a floor plan architecture. The radio wall switch includes a radio control board is configured to be removable and located outside of a wall receptacle while electrically coupled to the load circuit. The radio control board includes contact switches that are selectively depressed by a switch plate for manually controlling the load. The switch plate is flexible and can be deformed to simultaneously actuate multiple contact switches to place the radio wall switch in a program mode for grouping or binding the other electronic devices.

23 Claims, 7 Drawing Sheets

U.S. PATENT DOCUMENTS

| | | | |
|---|---|---|---|
| 4,567,375 A | 1/1986 | Jimerson et al. | 307/98 |
| 4,644,320 A | 2/1987 | Carr et al. | 340/310 A |
| 4,703,306 A | 10/1987 | Barritt | 340/310 CP |
| 4,755,792 A | 7/1988 | Pezzolo et al. | 340/538 |
| 4,764,717 A | 8/1988 | Tucker et al. | 323/364 |
| 4,764,981 A | 8/1988 | Miyahara et al. | 455/603 |
| 4,825,209 A | 4/1989 | Sasaki et al. | 340/825.72 |
| 4,918,432 A | 4/1990 | Pauley et al. | 340/573 |
| 4,939,792 A | 7/1990 | Urbish et al. | 455/347 |
| RE33,504 E | 12/1990 | Yuhasz et al. | 307/115 |
| 5,005,211 A | 4/1991 | Yuhasz | 455/603 |
| 5,017,837 A | 5/1991 | Hanna et al. | 315/136 |
| 5,051,720 A | 9/1991 | Kittirutsunetorn | 340/310 R |
| 5,079,559 A | 1/1992 | Umetsu et al. | 343/702 |
| 5,086,385 A | 2/1992 | Launey et al. | 364/188 |
| 5,099,193 A | 3/1992 | Moseley et al. | 323/324 |
| 5,109,222 A | 4/1992 | Welty | 340/825.72 |
| 5,146,153 A | 9/1992 | Luchaco et al. | 323/324 |
| 5,187,655 A | 2/1993 | Post et al. | 364/146 |
| 5,237,207 A | 8/1993 | Kwiatkowski et al. | 307/31 |
| 5,237,264 A | 8/1993 | Moseley et al. | 323/324 |
| 5,239,205 A | 8/1993 | Hoffman et al. | 307/117 |
| 5,248,919 A | 9/1993 | Hanna et al. | 315/291 |
| 5,321,736 A | 6/1994 | Beasley | 379/58 |
| 5,357,170 A | 10/1994 | Luchaco et al. | 315/159 |
| 5,382,947 A | 1/1995 | Thaler et al. | 340/825.22 |
| 5,399,940 A | 3/1995 | Hanna et al. | 315/129 |
| 5,400,041 A | 3/1995 | Strickland | 343/700 MS |
| 5,400,246 A | 3/1995 | Wilson et al. | 364/146 |
| 5,430,356 A | 7/1995 | Ference et al. | 315/291 |
| 5,455,464 A | 10/1995 | Gosling | 307/31 |
| 5,495,406 A | 2/1996 | Kushiro et al. | 364/140 |
| 5,555,150 A | 9/1996 | Newman, Jr. | 361/56 |
| 5,565,855 A | 10/1996 | Knibbe | 340/825.06 |
| 5,637,930 A * | 6/1997 | Rowen et al. | 307/112 |
| 5,637,964 A | 6/1997 | Hakkarainen et al. | 315/295 |
| D389,461 S | 1/1998 | Mayo et al. | D13/164 |
| 5,736,965 A | 4/1998 | Mosebrook et al. | 343/702 |
| D395,037 S | 6/1998 | Mayo et al. | D13/164 |
| 5,798,581 A | 8/1998 | Keagy et al. | 307/115 |
| 5,838,226 A | 11/1998 | Houggy et al. | 340/310.01 |
| 5,848,054 A | 12/1998 | Mosebrook et al. | 370/226 |
| D404,013 S | 1/1999 | Mayo et al. | D13/164 |
| 5,909,087 A | 6/1999 | Bryde et al. | 315/149 |
| 5,977,882 A | 11/1999 | Moore | 340/825.72 |
| 5,982,103 A | 11/1999 | Mosebrook et al. | 315/149 |
| 5,990,635 A | 11/1999 | Ference et al. | 315/362 |
| D422,969 S | 4/2000 | Mayo et al. | D13/164 |
| 6,046,550 A | 4/2000 | Ference et al. | 315/291 |
| D428,855 S | 8/2000 | Mayo et al. | D13/164 |
| 6,097,111 A * | 8/2000 | Anrod | 307/115 |
| 6,169,377 B1 | 1/2001 | Bryde et al. | 315/294 |
| 6,300,727 B1 | 10/2001 | Bryde et al. | 315/294 |
| 6,380,696 B1 | 4/2002 | Sembhi et al. | 315/294 |
| 6,528,957 B1 | 3/2003 | Luchaco | 315/307 |
| 6,545,434 B2 | 4/2003 | Sembhi et al. | 315/312 |
| 6,803,728 B2 | 10/2004 | Balasubramaniam et al. | 315/149 |
| 7,084,526 B2 * | 8/2006 | Bruwer | 307/87 |
| 7,119,459 B2 * | 10/2006 | Bruwer et al. | 307/140 |
| 7,122,976 B1 * | 10/2006 | Null et al. | 315/362 |
| 7,126,291 B2 * | 10/2006 | Kruse et al. | 315/316 |

FOREIGN PATENT DOCUMENTS

GB    43 08 161 C2    9/1994

OTHER PUBLICATIONS

"Solving X-10 Signal Collision Problems", X-10 Bumper Cars, pp. 5, no date.

"Three-Way Light Switch an Aid to Safety", Staten Island Advance, May 4, 1995, pp. D2.

Leviton Cat. No. 6698-1 (Ivory)-W (White) "DECORA The Design Collection", no date.

"Analysis of a Slot Microstrip Antenna" IEEE Transactions on Antennas and Propagation , vol. AP-34, No. 2 (Feb. 1986), pp. 155-163.

* cited by examiner

RADIO WALL SWITCH

RELATED APPLICATIONS

This application is a Continuation-in-part application of the co-pending U.S. patent application Ser. No. 10/934,222, filed on Sep. 3, 2004 and titled "LOCATION-BASED ADDRESSING LIGHTING AND ENVIRONMENTAL CONTROL SYSTEM, DEVICES AND METHOD", which claims priority under 35 U.S.C. § 119(e) from the Co-pending U.S. Provisional Patent Application Ser. No. 60/500,640, filed on Sep. 5, 2003, and titled "LOCATION-BASED ADDRESSING LIGHTING AND ENVIRONMENTAL CONTROL SYSTEM, DEVICE AND METHOD." This application also claims priority under 35 U.S.C. § 119(e) from the Co-pending U.S. Provisional Patent Application Ser. No. 60/625,370, filed on Nov. 5, 2004, and titled "RADIO WALL SWITCH." The U.S. patent application Ser. No. 10/934,222, filed on Sep. 3, 2004 and titled "LOCATION-BASED ADDRESSING LIGHTING AND ENVIRONMENTAL CONTROL SYSTEM, DEVICES AND METHOD"; the Provisional Patent Application Ser. No. 60/500,640, filed on Sep. 5, 2003, and titled "LOCATION-BASED ADDRESSING LIGHTING AND ENVIRONMENTAL CONTROL SYSTEM, DEVICE AND METHOD", and the Provisional Patent Application Ser. No. 60/625,370, filed on Nov. 5, 2004, and titled "RADIO WALL SWITCH." are all hereby incorporated by reference.

FIELD OF THE INVENTION

This invention relates to the field of lighting and environmental control systems, devices and methods. More particularly, this invention relates to systems, devices, and methods that use wireless control signals for operating and controlling electronic devices and load circuits that are electrically coupled to the electronic devices.

BACKGROUND OF THE INVENTION

There are a number of systems, device and methods for integrating electronic devices such as switches, outlets and light fixtures. Most commonly, switches, outlets and light fixtures are hardwired together. Such systems are installed during the construction of a building and are extremely difficult to reconfigure or retrofit after the construction of the building is complete. Further, such hardwired systems are not capable of supporting complex operations where, for example, electronic devices in the same space, or in a different space, need to operate collectively.

With the advancement of technology, a number of wireless systems for integrating electronic devices have emerged. For example, Mosebrook et al. in U.S. Pat. No. 5,982,103 describe a radio wall switch that can be used to operated lights electrically coupled to the radio wall switch using a remote control device, wherein the lights can be turned on, turned off, or dimmed.

One of the shortcomings of these prior art wireless systems, such as described by Mosebrook et al., is that they generally do not support the bandwidth required to operate and control complex arrangements and large numbers of electronic devices, such as can be required in large buildings or complexes. Further, these prior art wireless systems are not easily programmed or reconfigured and usually require a professional to install them. Also, these prior art wireless systems can suffer from poor reception and weak transmission of the radio control signals and, therefore, can require that the communicating electronic devices are in a preferred orientation and/or in close proximity with one another in order to function properly.

The present invention is directed to electronic devices that can be easily configured or programmed to suit the application at hand. Further, the electronic devices of the present invention can be programmed to operate collectively and to support complex arrangements of electronic devices while requiring less bandwidth than prior art devices. Further, the electronic devices of the present invention are configured to communicate between each other with less noise and interference.

SUMMARY OF THE INVENTION

The present invention is directed to a switch unit, also referred to herein as a wall switch. The wall switch is configured to be electrically coupled to a load circuit through, for example, load circuit connectors. The wall switch can control or regulate an electronic load through the load circuit and thereby control the operation or output of lights and/or appliances that are powered through the load circuit. The wall switch is also preferably configured to transmit wireless signals for controlling and programming other electronic device. The wall switch is itself also configured to receive wireless signals from other electronic devices, such as a hand-held remote control device, for automatically and remotely controlling the electrical load through the load circuit. The wireless signals are preferably transmitted and received from the wall switch with a radio transducer that operates at frequencies within a range of 902 MHz to 928 MHz In accordance with the embodiments of the invention, the wall switch includes contact members or contact switches that can be depressed or otherwise actuated to manually control the electrical load through the load circuit. The switch unit also preferably includes a flexible or resilient switch plate positioned over the contact switches for selectively actuating the contact switches by pushing a first side and second side of the switch plate, respectively.

In accordance with the preferred embodiment of the invention, the switch unit is placed into a program mode by depressing the first contact switch and the second contact switch simultaneously. This can be accomplished by simultaneously pushing the first side and the second side of the flexible or resilient switch plate. In the program mode, other electronic devices can be grouped or bound together such that all the grouped or bound electronic devices can respond to the same radio control signals. Accordingly, several electronic devices can be controlled by transmitting or broadcasting the same radio control signal that includes a data field identifying the grouped or bound electronic devices.

Electronic devices are preferably grouped or bound according to their respective locations, such as a building, a floor and/or a room. Alternatively, or in addition, to grouping or binding electronic devices according to their respective locations, electronic devices can be grouped or bound according to the types and/or functions of the electronic devices.

Controlling electronic devices according to their locations within a building architecture and programming electronic device to respond to radio control signals that identify their respective locations within the building architecture is referred to as Location-Based Addressing and Location-Based Commissioning, respectively. Details of Location-Based Addressing and Location-Based Commissioning are described in the U.S. patent application Ser. No. 10/934,222, filed Sep. 3, 2004 and titled "LOCATION-BASED ADDRESSING LIGHTING AND ENVIRONMENTAL CONTROL SYSTEM, DEVICES AND METHOD," the contents of which are hereby incorporated by reference.

The wall switch in accordance with the embodiments of the invention includes a housing configured to fit into and secure to a wall receptacle. The wall switch is, for example, secured to the wall receptacle through a yoke or a bracket structure. Within the housing there is a load control circuit that is configured to electrically couple to the load circuit through load circuit connectors, such as described above. The load control circuit includes electronic components required to manually control the electrical load by actuating the contact switches through the flexible or resilient switch plate. The wall switch also preferably includes a radio control board that is electrically coupled to the load control circuit. The radio control board includes a radio transducer, an antenna and a micro-processor for generating radio control signals, to program other electronic devices, and for processing radio control signals, to generate output control signals to the load control circuit for controlling the electrical load through the load circuit.

The radio control board is preferably electrically coupled to the load control circuit through a detachable plug, connector or adapter such that the radio control board can be removed and/or replaced. Accordingly, in the event that the radio control board fails, it can be readily replaced without removing the housing and the load control circuit from the wall receptacle. Further, the radio control board can be replaced with a different control board that does not include radio components when such capabilities or features are not necessary and can be readily upgraded with a radio control board when such capabilities or features are necessary.

In accordance with the embodiments of the invention, the radio control board is electrically coupled to the load control circuit while being positioned outside of, or external to, the wall receptacle. Positioning the radio control board with the transducer and the antenna outside of, or external to, the wall receptacle reduces or prevents interference by the receptacle box during the transmission and reception of radio signals.

In accordance with the method of the present invention, electronic devices are grouped or bound by commissioning or programming the electronic devices with Location Descriptors using a radio wall switch, as described above. The electronic devices that are grouped or bound together are capable of responding to that same radio control signals when the radio control signals include data field corresponding the Location Descriptors or a wild card.

In order to bind or group the electronic devices, opposed sides of the switch plate are simultaneously pushed to simultaneously actuate two or more contact switches on the radio wall switch and thereby place the radio wall switch in a program mode. After, the radio wall switch is placed in the program mode, the wall switch broadcasts a radio signal with a Location Identifier that includes a randomly selected Location Descriptor. In the event that one or more electronic devices in a receiving space already owns that randomly selected Location Descriptor, then the electronic device that owns that Location Descriptor will send a radio signal response that tells the wall switch that the Location Descriptor is taken and the radio wall switch will generate a new randomly selected Location Descriptor and repeat the process until it finds a Location Descriptor that is available. Once the radio wall switch identifies a Location Descriptor that is available, then the radio wall switch will broadcast radio binding message.

Preferably, all of the electronic devices that are to be grouped or bound are placed in a program mode and are listening for the radio binding message. All of the electronic devices that are to be grouped or bound together can be placed in the program mode by, for example, pushing one or more buttons on each of the electronic devices. After the radio binding message is received by each of the electronic devices, then the Location Descriptor is stored at each of the electronic devices by, for example, depressing a button on each of the electronic devices.

DETAILED DESCRIPTION OF THE INVENTION

The present invention is directed to a radio wall switch that is configured to program or commission devices, such as outlets, switches, lights with or more Location Descriptors such that the electronic devices can respond to the same radio control signals. The Location Descriptors preferably correspond to the physical locations of the electronic devices, such as determined by a floor plan. The methods of programming or commissioning electronic devices is referred to herein as grouping or binding electronic devices and is also referred to as Location-based Addressing are described in U.S. patent application Ser. No. 10/934,222, filed Sep. 3, 2004, titled "LOCATION-BASED ADDRESSING LIGHTING AND ENVIRONMENTAL CONTROL SYSTEM, DEVICES AND METHOD," referenced previously. Pursuant to such commissioning, programming, grouping or binding of the electronic devices, the electronic devices can be operated, and can inter-operate, by messages directed to spatial locations or addresses, rather than individual device addresses or logical addresses where handshaking or two-way communication is generally required. This allows large numbers of electronic devices to traffic radio control signals with less band width. Further, Location-Based addressing allows devices to perform complex and coordinated operations.

Figure 1:
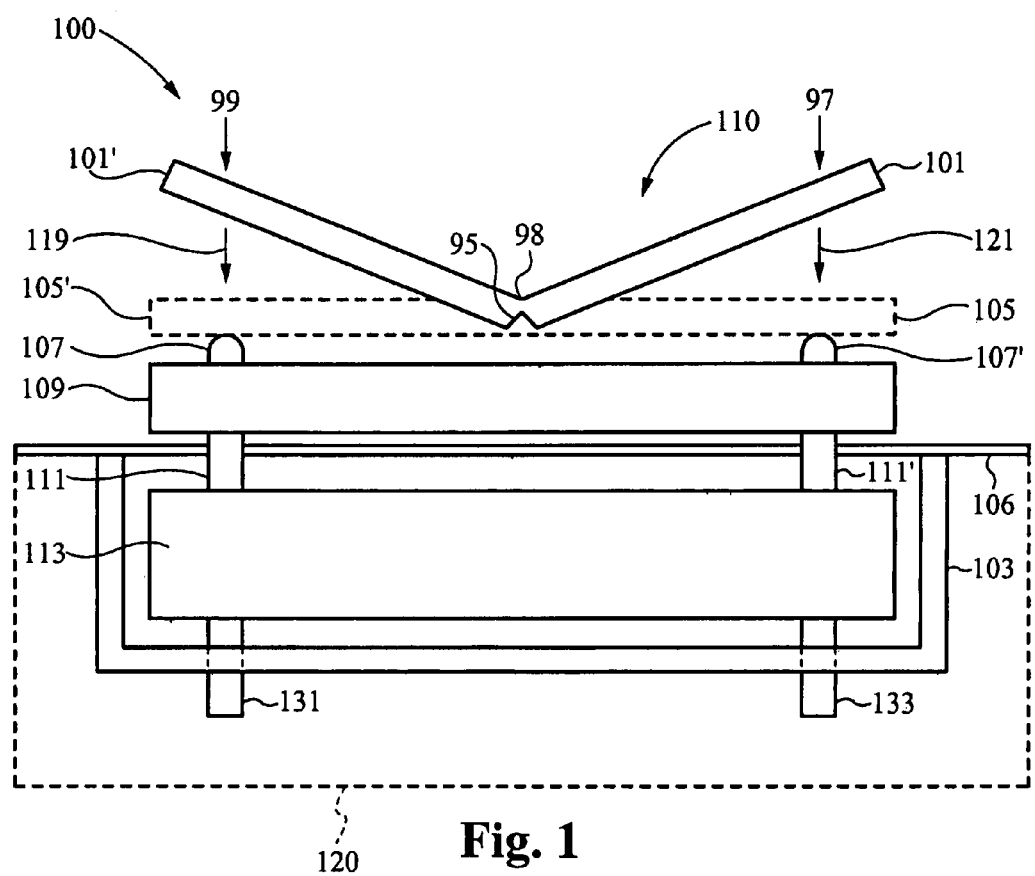
FIG. 1 shows a cross-sectional view of a radio wall switch with a flexible and resilient switch plate, in accordance with the embodiments of the invention.

Referring to FIG. 1, a radio wall switch 100, in accordance with the embodiments of the invention, includes a housing 103 configured to fit into and secure to a wall receptacle, as indicated by the doted line 120. The radio wall switch 100 is, for example, secured to the wall receptacle through a yoke or a bracket structure 106. Within the housing 103 there is a load control circuit 113 that is configured to electrically couple to load circuit (not shown) through load circuit connectors 131 and 133. The load control circuit 113 includes electronic components required to control the electrical load through the load circuit.

Still referring to FIG. 1, the radio wall switch 100 includes a first contact switch 107 and second contact switch 107'. The first contact switch 107 and second contact switch 107' can be depressed or otherwise actuated to manually control the electrical load through the load circuit to, for example, control the output of lights. The radio wall switch 100 also preferably includes a flexible or resilient switch plate 110 positioned over the first contact switch 107 and the second contact switch 107'. The flexible and resilient switch plate 110 is configured to selectively acuate the first contact switch 107 and the second contact switch 107' individually. For example, by pushing a first side 97 of the flexible and resilient switch plate 110, the first side 97 moves downward, as indicated by the arrow 121, to a first contact position 105 and actuates the first contact switch 107. After releasing the first side 97 the flexible or resilient switch plate 110, the first side 97 returns and an upward or resting position 101. By pushing a second side 99 of the flexible and resilient switch plate 110, the second side 99 moves downward, as indicated by the arrow 119, to a second contact position 105' and actuates the second contact switch 107'. After releasing the second side 99 of the flexible and resilient switch plate 110, the second side 99 returns to an upward or resting position 101'. The flexible and resilient switch plate 110 can be configured to toggle between the first contact position 105 and the second contact position through a swivel or hinge region 98.

In accordance with the embodiments of the invention, the flexible and resilient switch plate 110 is also configured to simultaneously actuate the first contact switch 107 and the second contact switch 107'. For example, by simultaneously pushing the first side 97 and the second side 99 of the flexible and resilient switch plate 110, the first side 97 and the second side 99 move downwards, as indicated by the arrows 121 and 119, to both the first contact position 105 and the second contact position 105' to actuate both the first contact switch 107 and the second contact switch 107'. The flexible or resilient switch plate 110 is preferably deformed of bent though a flexible region 98 that acts as a living hinge, such that when the first side 97 and the second side 99 are released, the sides 97 and 99 assume the resting position 101 and 101' over the contact switches 107 and 107'. When the first contact switch 107 and the second contact switch 107' are both simultaneously actuated, then the radio wall switch 100 is placed in a program mode. In the program mode, other electronic devices can be grouped or bound together such that grouped or bound electronic devices can respond to the same radio control signals, as described above and below.

Still referring to FIG. 1, the radio wall switch 100 also preferably includes a radio control board 109 that is electrically coupled to the load control circuit 113. The radio control board 109 includes a radio transducer, an antenna and a micro-processor (not shown) for generating radio control signals to program other electronic devices and for processing radio control signals to generate output control signals to the load control circuit 113 for controlling the electrical load through the load circuit. The radio control board 109 is preferably electrically coupled to the load control circuit 113 through one or more detachable plugs, connectors or adapters 111 and 111', such that the radio control board 109 can be removed and replaced. Preferably, the radio control board 109 is electrically coupled to the load control circuit 113 and is positioned outside of, or external to, the wall receptacle 120 and/or the housing 103.

Figure 2:
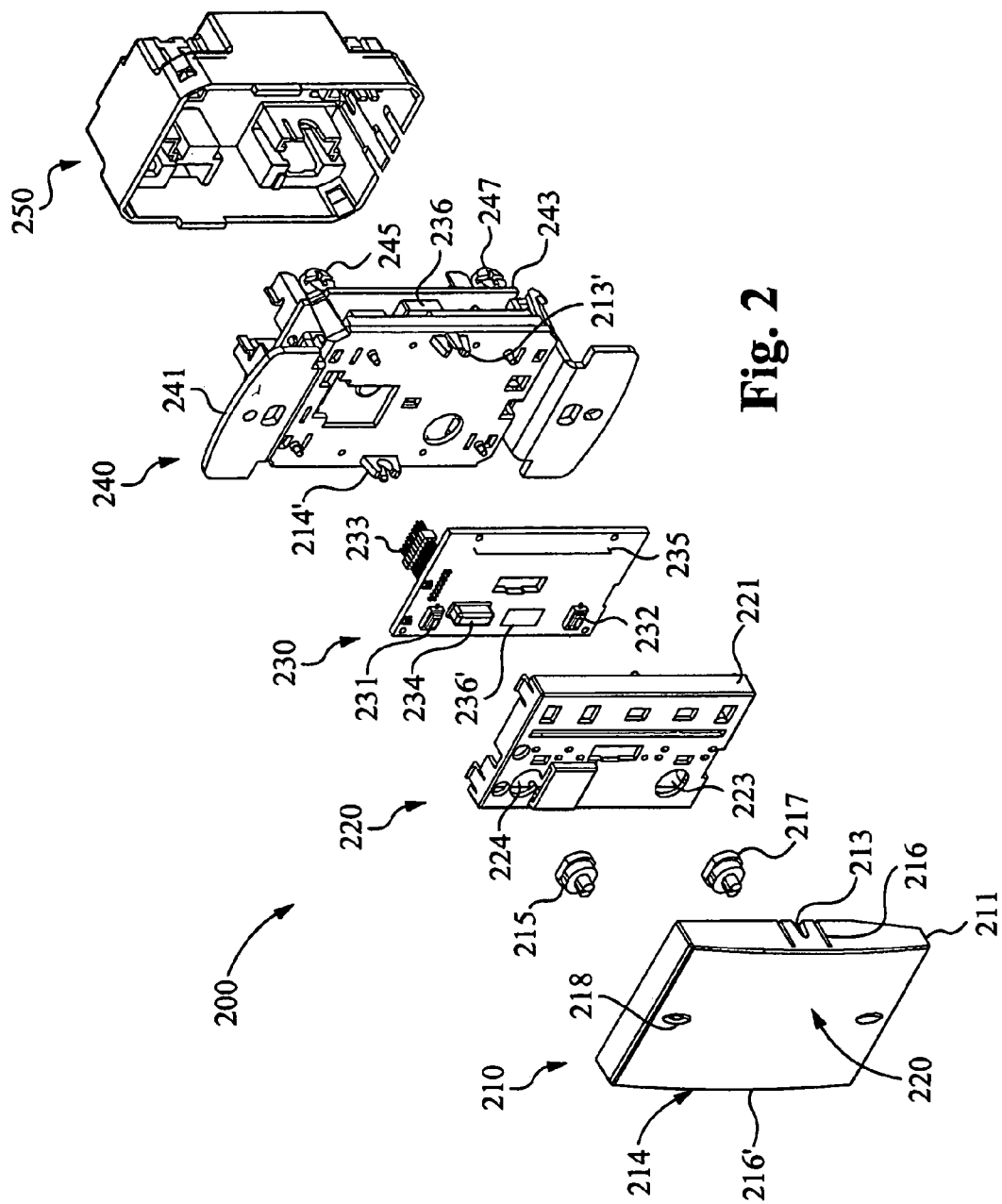
FIG. 2 shows an exploded view of the radio wall switch, in accordance with the embodiments of the invention.

FIG. 2 shows an exploded view of the radio wall switch 200, in accordance with the embodiments of the invention. The radio wall switch 200 includes a housing 250 configured to fit into and secure to a wall receptacle (not shown). The radio wall switch 200 also includes a load control unit 240 that includes a yoke or bracket 241 and a load control circuit 241 for electrically coupling to a load circuit (not shown) and controlling an electrical load through the load circuit. The load control unit 240 can also include a micro-processor for running firmware that an controlling the radio wall switch 200. The load control unit is electrically coupled to the load circuit through load circuit connectors 245 and 247.

Still referring to FIG. 2, the radio wall switch 200 also includes radio control board 230 that is electrically coupled to the load control circuit 243 through a plug connector 233. The radio control board 230 includes a radio transducer 234 and an antenna 235. In addition to the micro-processor 236, or alternatively to the micro-processor 236, the radio control board can also include a micro-processor 236 for radio control operation, such as described above. The radio transducer 234 preferably transmits and receives radio control signals with frequencies within a range of 902 MHz to 928 MHz. The micro-processor 236 is programmed and stores firmware to perform the required task of broadcasting radio control signals and processing control signals to automatically control the electrical load through the load circuit.

The radio control board 230 includes contact switches 231 and 232 that are preferably micro-switches configured to be selectively and simultaneously actuated, as describe above. The radio wall switch can also include a protective cover 220 for protecting the critical components on the radio control board 230. The radio wall switch 200 also preferably includes rubber boots 215 and 217 for covering the micro-switches 231 and 232 and protecting the micro-switches 231 and 232 from the shock associated with repetitive actuation.

The radio wall switch 200 includes a flexible and resilient switch plate 210 that couples to the load control unit at hinge positions 213 and 214, which clip onto hinge features 213' and 214', such that the flexible and resilient switch plate 210 can toggle between and selectively actuate the micro-switches 231 and 232, as described above with reference to FIG. 1. The flexible and resilient switch plate 210 has flexible regions 216 and 216' that allows the flexible and resilient switch plate 210 to bend when a top portion 218 and a bottom portion 220 are simultaneously pressed actuating both of the micro-switches 231 and 232 and placing the radio wall switch 200 in a program mode.

Figure 3A:
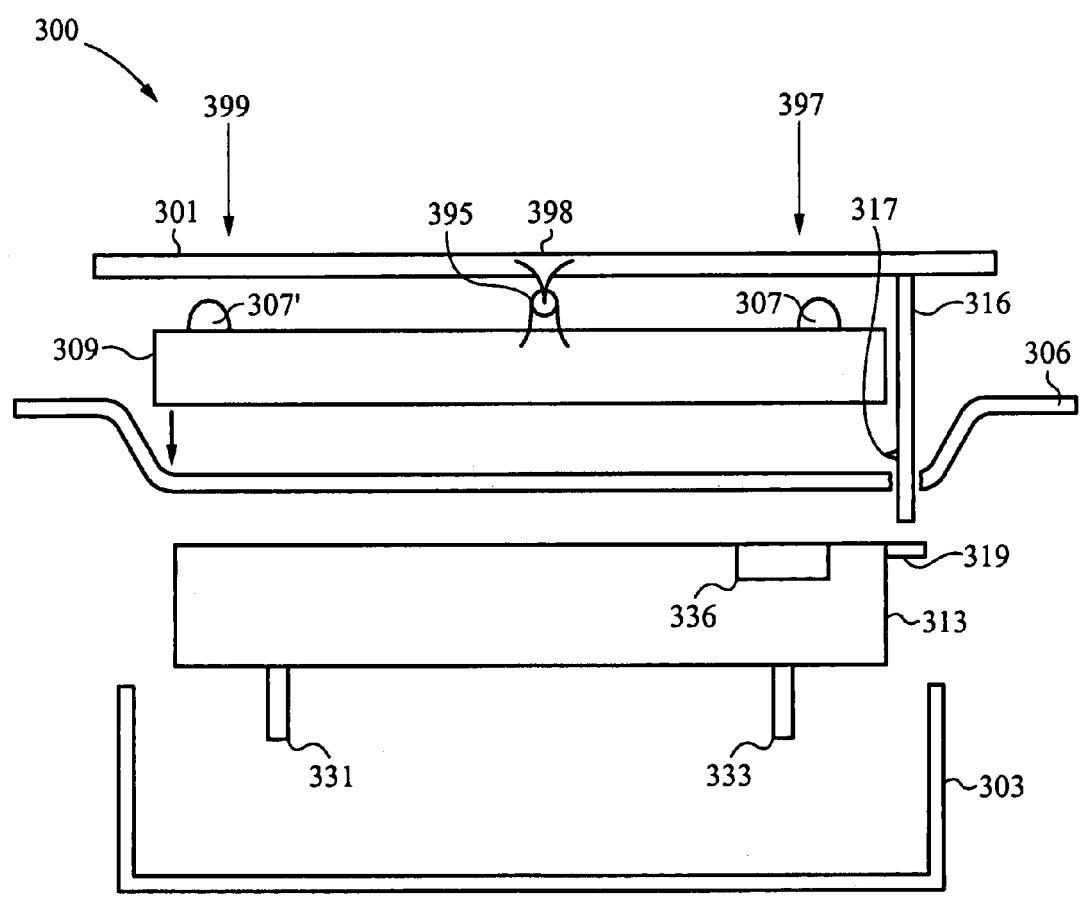
FIGS. 3A-B show a radio wall switch with an over-press disabling feature, in accordance with the embodiments of the invention.

Referring now to FIG. 3A, a radio wall switch 300, in accordance with a preferred embodiment of the invention, includes a housing 303 configured to fit into and secure to a wall receptacle or outlet box (not shown). The radio wall switch 300 is securable to the wall receptacle or outlet box through a yoke or a bracket structure 306. The radio wall switch 300 also includes a load control circuit 313 that is configured to electrically couple to a load circuit (not shown) through load circuit connectors 331 and 333. The load control circuit 313 includes electronic components required to control the electrical load through the load circuit and also includes a micro-processor 336 for running the necessary firmware to operate, control and/or program the radio wall switch 300 manually or remotely using radio control signals, such as described above and below. The load control circuit 313 also preferably includes an override micro-switch 319 that can be actuated for disabling and/or cutting power to the radio wall switch 300, such that the radio wall switch 300 can be serviced without the risk of electrical shock.

Still referring to FIG. 3A, the radio wall switch 300 includes contact switches 307 and 307' that are manually depressed or actuated to control an electrical load through the load circuit by toggling a flexible or resilient switch plate 301 positioned over the contact switches 307 and 307', such as described above with reference to FIG. 1. The flexible and resilient switch plate 301 is configured to toggle between positions for contacting and depressing or actuating contact switches 307 and 307' individually through a swivel or hinge region 395. The flexible and resilient switch plate 301 is also configured to simultaneously contact and depress or actuate both contact switches 307 and 307' by pressing both sides 397 and 399 of the flexible and resilient switch plate 301 positioned over the contact switches 307 and 307', respectively, and deforming or bending the flexible and resilient switch plate 301 though a flexible region 398. By depressing or actuating both of the contact switches 307 and 307', the radio wall switch 300 is placed in a program mode, whereby other electronic devices can be grouped or bound together to respond to radio control signals, as described above and below. The flexible and resilient switch plate 301 also includes an actuator arm 316 that is configured to actuate the override micro-switch 319 when the flexible and resilient switch plate 301 is placed in an "over-press" position by over pressing the side 397 of the flexible and resilient switch plate 301 positioned over the contact switch 307, such as shown in FIG. 3B.

Still referring to FIG. 3A, the radio wall switch 300 includes a radio control board 309 that is electrically coupled to the load control circuit 313. The radio control board 309 also includes a radio transducer and an antenna for generating and transmitting, respectfully, radio control signals to program other electronic devices and for processing radio control signals to generate output control signals to the load control circuit 313 for controlling the electrical load through the load circuit. The radio control board 309 is preferably electrically coupled to the load control circuit 313 through one or more detachable plugs, connectors or adapters, such as described with reference to FIG. 1, whereby the radio control board 309 can be removed and replaced. Preferably, the radio control board 309 is electrically coupled to the load control circuit 313 and is positioned outside of, or external to, the wall receptacle and/or the housing 303.

Figure 3B:
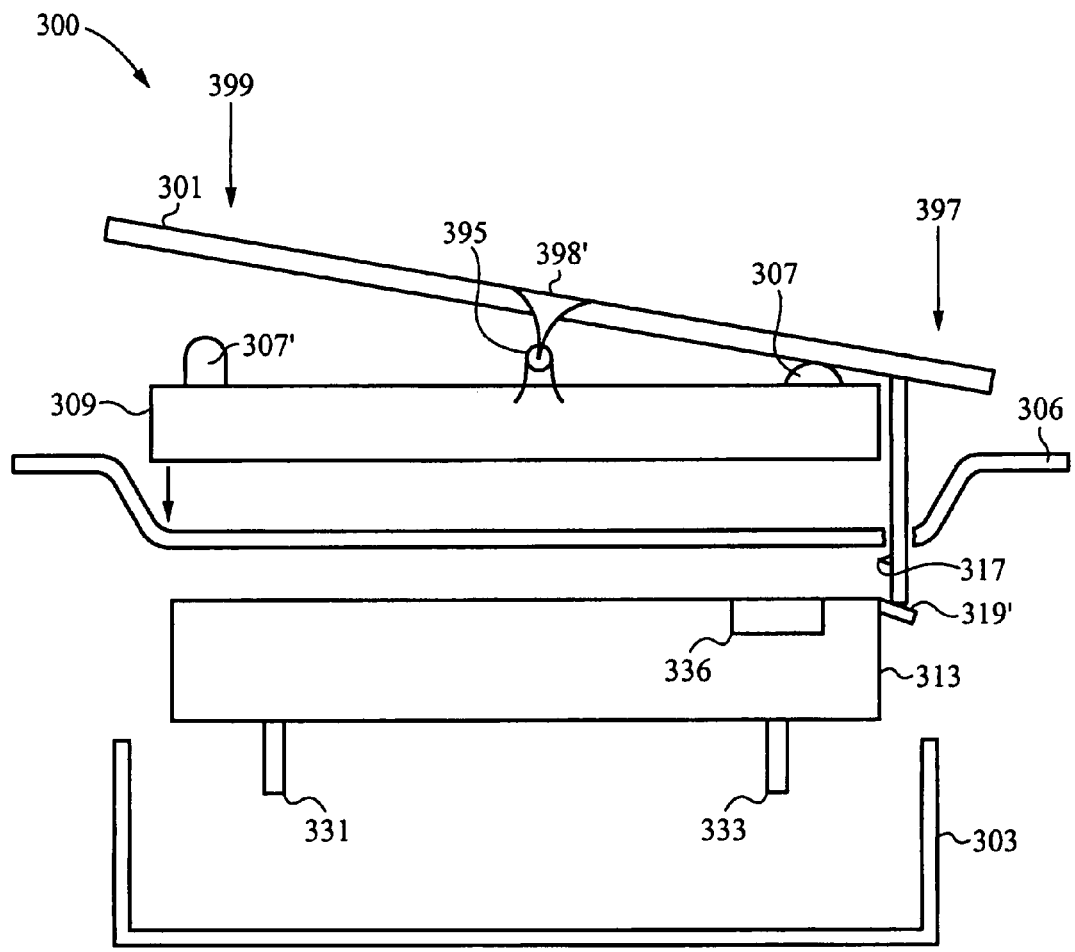

Referring now to FIG. 3B, the radio wall switch 300 is disabled by over-pressing the side 397 of the flexible and resilient switch plate 301, such the actuator arm 316 places the override micro-switch 319 (FIG. 3A) in an off position 319'. Preferably, the actuator arm 316 includes a lock feature 317 that snaps, clips or otherwise secures the flexible and resilient switch plate 301 in the over-press position and keeps the load control circuit 313 from getting electrical power, such that the radio wall switch 300 can be serviced without the risk of electrical shock.

Figure 4A:
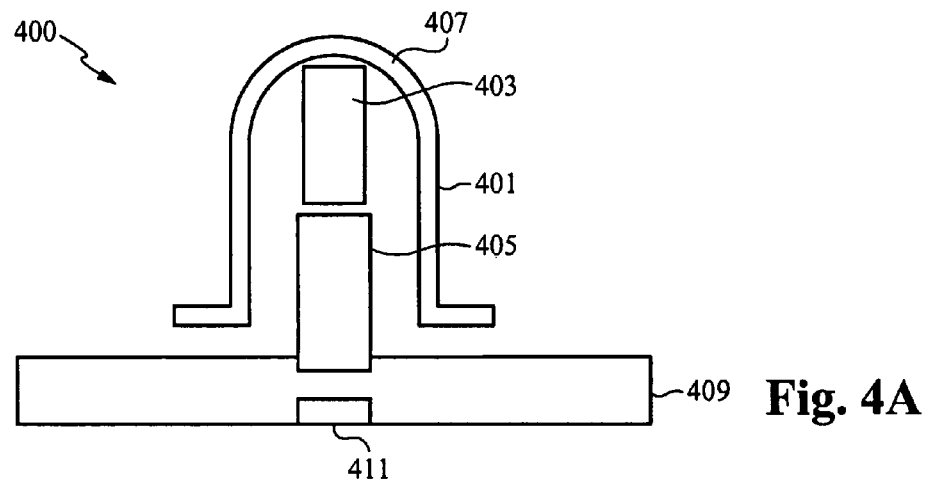
FIGS. 4A-C show cross-sectional views of a contact switch portion of a radio control board, in accordance with the embodiments of the invention.
Figure 4B:
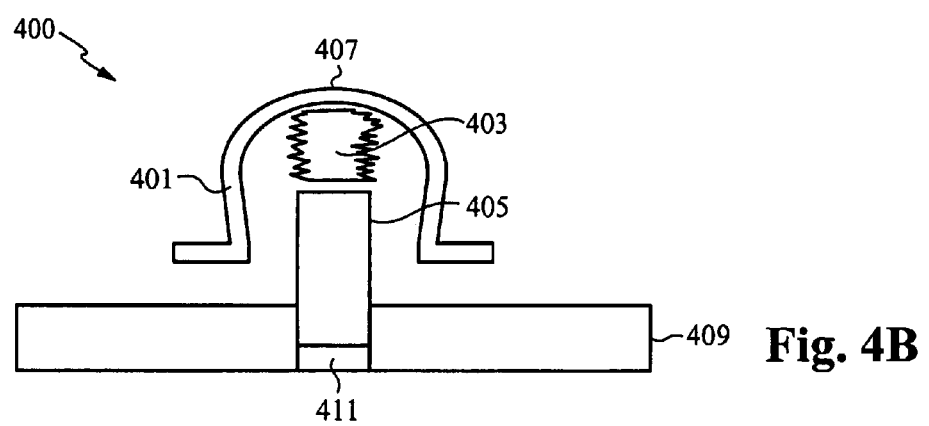
Figure 4C:
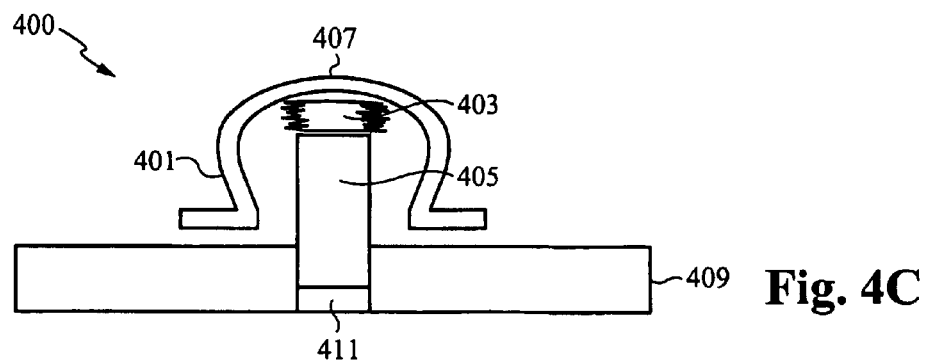

FIGS. 4A-C show cross-sectional views of a contact switch 400 counted to a portion of a radio control board 409 that allows a radio wall switch, such as described with reference to FIGS. 3A-3B, to be manually operated and placed into an over-press position. Referring now to FIG. 4A, the contact switch 400 includes a flexible boot 401 that is formed from rubber or any other suitably flexible material or materials. The flexible boot 401 covers a first 405 and a second contact 411. Between the flexible boot 401 and the first contact 405 there is a resilient member 403. The resilient member 403 is formed from a compressible material, including, but not limited to, rubber, foam, spring metal and a combination thereof. The resilient member 403 provides a degree of resistance to deformation pressure or force and is applied to a surface 407 of the flexible boot 401 and exhibits sufficient structural memory that resilient member 403 substantially returns to its original form in the absence of the applied pressure or force.

In operation, the contact switch 400 can be contacted and depressed from the surface 407 of the flexible boot 401 through a flexible and resilient switch plate 301 (FIGS. 3A-B) to place the contact switch in a first position, such as shown in FIG. 4B. In the first position, the flexible boot 401 and the resilient member 403 are partially deformed and the resilient member 403 provides sufficient resistance to deformation that the applied pressure or force causes the first contact 405 to be lowered and come into electrical contact with the second contact 411, thereby closing the contact switch 400.

Referring now to FIG. 4C, applying a greater pressure or force to the surface 407 of the flexible boot 401 through a flexible and resilient switch plate 301 (FIGS. 3A-B), the flexible boot 401 and the resilient member 403 are further deformed or compressed to a second position, referred to herein as an over-press position, whereby the override micro-switch 319 (FIG. 3A) is actuated to the off position 319' (FIG. 3B) and electrical power to the radio wall switch 300 is prevented. After the applied pressure or force is removed from the surface 407 of the flexible boot 401, the first contact 405 and the second contact 411 separate, thereby opening the contact switch 400, and the flexible boot 401 and the resilient member 403 substantially return to their original forms, such as shown in FIG. 4A.

Figure 5:
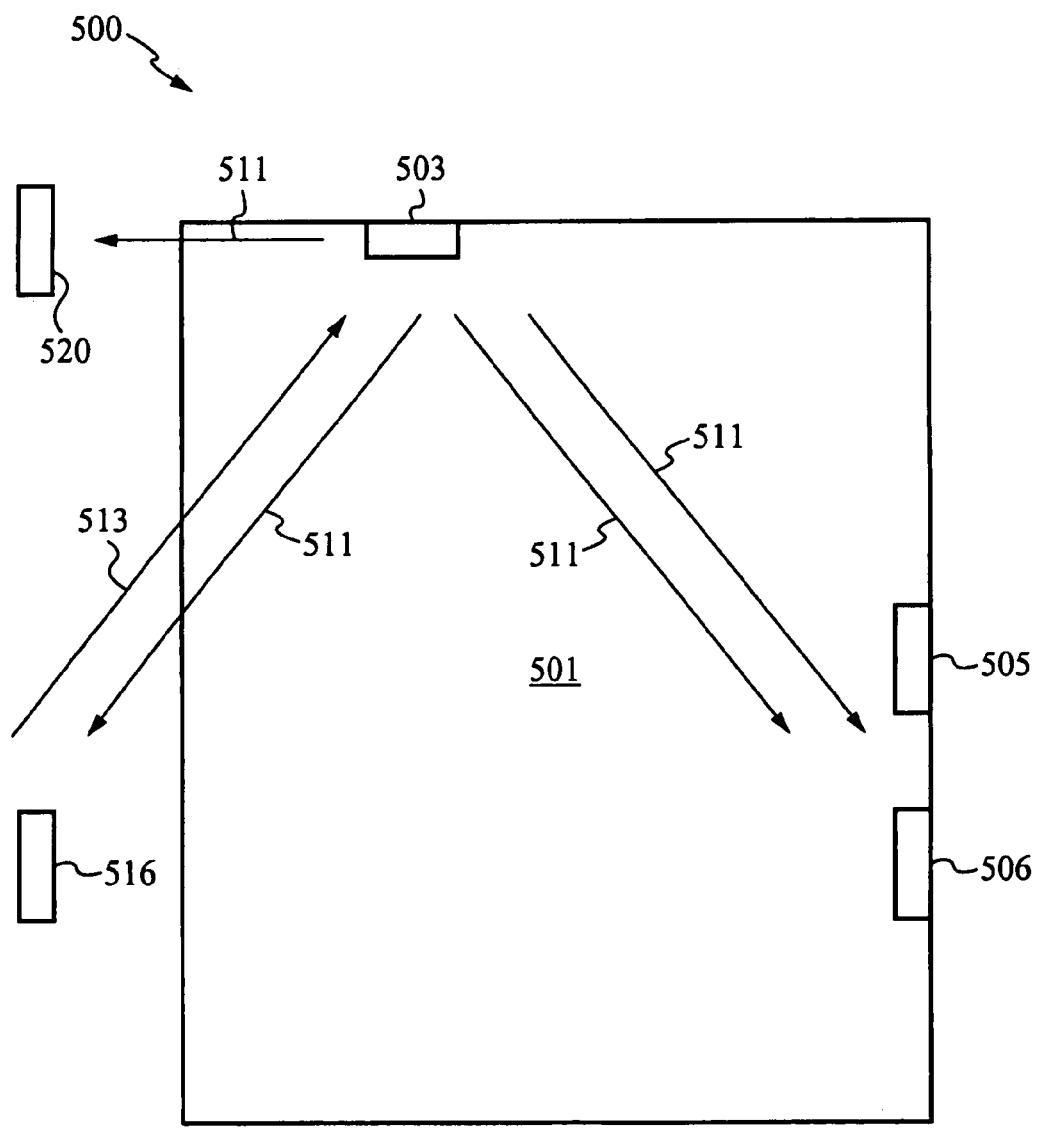
FIG. 5 is a schematic of a room with a plurality of radio controlled electronic devices, in accordance with the embodiments of the invention.
Figure 6:
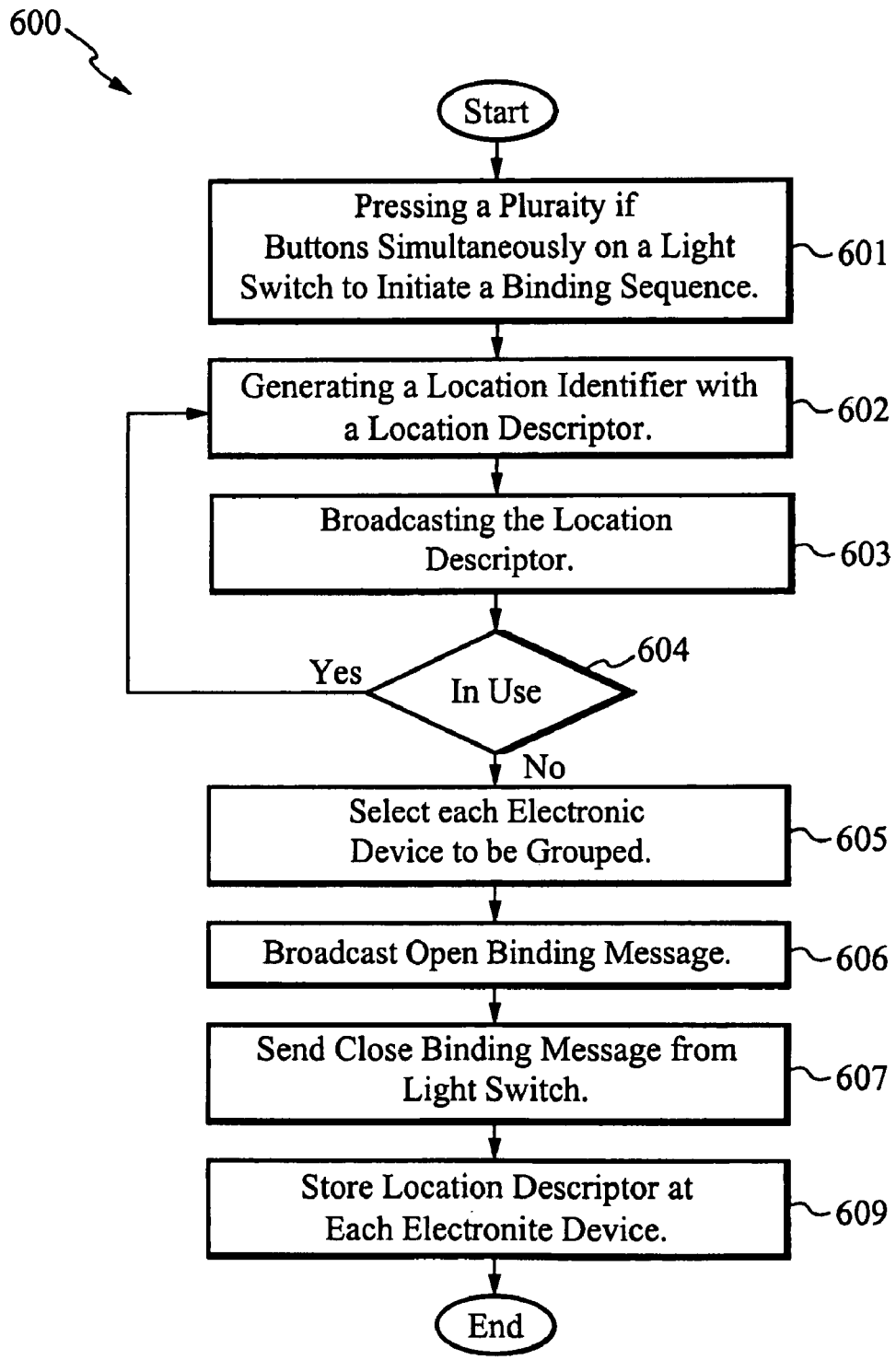
FIG. 6 is a block diagram outlining the steps for grouping or binding electronic devices with a radio wall switch, in accordance with the method of the present invention.

FIG. 5 shows a simplified schematic 500 of a room 510 with a plurality of electronic devices 503, 505 and 506 and an external electronic devices 516 and 520 that have radio control capabilities. For the purpose of this description, the electronic device 503 is denoted as a radio wall switch, such as described above. The electronic devices 505, 506, 509, 516 and 520 are wall switches, outlets, light fixtures or any combination thereof. Each of the electronic devices 503, 505, 506, 516 and 520 and are hardwired to a load circuits that are electrically isolated from each other. FIG. 5 and the block diagram 600 in FIG. 6 will now used to describe a method for selectively grouping or binding electronic devices 503, 505, 506 and 516 to operate collectively and respond to radio control signals that includes a common Location Descriptor.

In accordance with the method of the present invention the electronic devices 503, 505, 506 and 516 are bound together by placing the radio wall switch 503 in the program mode in the step 601. Preferably, the radio wall switch 503 is placed in the program mode by simultaneously pushing a plurality of buttons on the wall switch through a flexible and resilient switch plate, as described with reference to FIG. 1 and FIG. 2. After the radio wall switch 503 is placed in the program mode in the step 601, in the step 602 the radio wall switch 503 generates a Location Identifier containing a Location Descriptor. After the radio wall switch 503 generates a first Location Identifier with a Location Descriptor in the step 603, in the step 603 the radio wall switch 503 broadcasts a radio signal with the first Location Descriptor.

All of the other electronic devices 505, 506, 516 and 520 can "listen" to the radio signal with the first Location Descriptor. If one or more of the electronic devices 505, 506, 516 and 520 already owns the first Location Descriptor broadcasts by the radio wall switch 503, then in the step 603 the electronic devices or devices will transmit a radio signals that informs the radio wall switch 503 that the first Location Descriptor selected is already taken. For example, if the electronic device 516 owns the first Location Descriptor, then in the in the step 604 the electronic device 516 sends a radio signal 513 that instructs radio wall switch 503 that the first Location Descriptor is taken. After the radio wall switch 503 receives the radio signal 513, in the step 602 the radio wall switch 503 generates a second Location Descriptor and in the step 603 broadcasts a radio signal with the second Location Descriptor. The steps 602 and 603 are repeated until an available Location Descriptor is identified in the step 604.

After an available Location Descriptor is identified in the step 604, in the step 606 the radio wall switch 503 broadcasts an open binding message 511 and all of the electronic devices 505, 506 and 516 that are to be grouped to receive the open bind signal 511, which can be indicated or confirmed by, for example, a blinking light on each of the electronic devices 505, 506 and 516.

In some cases, it is necessary to select which of the electronic devices that are to be grouped or bound together in the step 605, prior to broadcasting an open binding message in the step 605. For example, each of the electronic devices 505, 506 and 516 can be placed in a program mode by pushing one or more buttons on each of the electronic devices 505, 506 and 516 prior to the step 605.

After the open binding message is broadcast in the step 606, in the step 607 the radio wall switch broadcasts a closed binding message that is received at each of the electronic devices 505, 506 and 516 and in the step 609 each of the electronic devices 505, 506 and 516 stores the Location Descriptor, thereby grouping or binding each of the electronic devices 505, 506 and 516 with a common Location Descriptor. After the electronic devices 505, 506 and 516 are grouped or bound together, they are capable of responding to that same radio control signals when the radio control signals are coded or have a data field corresponding the common Location Descriptor or wild card. Radio control signals that include the common Location Descriptor can be transmitted to control all of the load circuits electrically coupled to the electronic devices 503, 505, 506 and 516 using a hand-held remote control device, using the electronic devices themselves and/or using other electronic devices not shown.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention. For example, electronic devices can be programmed with any number of descriptors and grouped or bound together in any number of different ways to support complex architectures and preform complex operations. Further radio control signals can include data that codes for multiple descriptors.

What is claimed is:

1. A switch unit for coupling to a load circuit, the switch unit comprising:
 a) a first contact switch and a second contact switch for controlling a load through the load circuit, wherein actuating the first contact switch increases the load through the load circuit and wherein depressing the second contact switch decreases the load through the load circuit; and
 b) a flexible switch plate position over the first contact switch and the second contact switch for selectively actuating the first contact switch and the second contact switch by pushing a first side and second side, respectively, and for simultaneously actuating the first contact switch and the second contact switch by simultaneously pushing the first side and the second side to place the switch unit into a program mode.

2. The switch unit of claim 1, further comprising a wireless means for automatically controlling the load circuit in response to remotely transmitted instructions.

3. The switch unit of claim 1, wherein the wireless means comprises a radio control board.

4. The switch unit of claim 3, wherein the radio control board is configured to transmit and receive radio signals having frequencies within a range of 902 MHz to 928 MHz.

5. The switch unit of claim 1, further comprising a micro-processor for processing the radio instructions and to generate output commands therefrom.

6. The switch unit of claim 5, further comprising a load control circuit electrically coupled to the micro-processor for receiving the control commands and controlling the load circuit based on the control commands.

7. The switch unit of claim 6, further comprising a housing for coupling to a wall receptacle and for housing the load control circuit.

8. The switch unit of claim 1, wherein radio control board includes a radio transducer, an antenna, and a micro-processor.

9. The switch unit of claim 8, wherein the first contact switch and the second contact switch comprise micro-switches on the removable radio control board.

10. A light control unit, the light control unit comprising:
 a) a housing configured to fit into and secure to a wall receptacle;
 b) a load control circuit within the housing for coupling to a load circuit;
 c) a radio control board electrically coupled to the load control circuit for controlling the load through load control circuit in response to radio transmitted instructions, wherein the radio control board is configured to be positioned externals to the wall receptacle;
 d) contact switches for manually controlling the load through the load control circuit; and
 e) a flexible and resilient switch plate positioned over the contact switches for selectively engaging the contact switches to manually adjust the load through the load control circuit, the switch plate being sufficiently flexible to bend and simultaneously actuate the contact switches and place the light control unit in a program mode.

11. The light control unit of claim 10, where the radio control board is electrically coupled to the load control circuit through a connector plug and is removable through the connector.

12. The light control unit of claim 11, wherein the radio control board includes radio transducer and an antenna for receiving the radio transmitted instructions and generating output control signals to the load control circuit.

13. The light control unit of claim 12, the contact switches are micro-switches that mounted on the radio control board and in electrical communication with the load control circuit through the connector plug.

14. The light control unit of claim 10, wherein the flexible and resilient switch plate toggles through a hinge region for selectively engaging the contact switches.

15. The light control unit of claim 10, further comprising load circuit connectors for coupling to the load circuit.

16. A method of grouping electronic devices through a switch unit to respond to radio control commands transmitted with a common Location Descriptor, the method comprising:
  a) pushing a first side and a second side of a resilient and flexible switch plate to simultaneously contact a first micro-switch and a second micro-switch to place the switch unit in program mode, wherein flexible and resilient switch plate is configured to selectively and independently contact the first micro-switch and the second micro-switch when a force is applied to the first side and second side, respectively;
  b) broadcasting a Location Identifier with a Location Descriptor from the switch unit using a radio waves;
  c) receiving the Location Identifier at the each of the electronic devices to be grouped; and
  d) storing the common Location Descriptor at each of the electronic devices, thereby grouping the grouping electronic devices.

17. The method of claim 16, wherein storing the Location Descriptor at each of the electronic devices comprises actuating a button on each of the electronic devices.

18. The method of claim 16, further comprising selecting electronic devices to be grouped by actuating one or more buttons on each of the electronic devices.

19. The method of claim 16, wherein the radio waves have frequencies within a range of 902 MHz to 928 MHz.

20. The method of claim 16, wherein the common Location Descriptor corresponds to a physical location of the switch unit.

21. The method of claim 20, wherein the common Location Descriptor includes a data field that includes a code for a building.

22. The method of claim 20, wherein the common Location Descriptor includes a data field that includes a code for a floor.

23. The method of claim 20, wherein the common Location Descriptor includes a data field that includes a code for a room.

* * * * *